United States Patent
Kuncoro

(10) Patent No.: US 9,940,176 B2
(45) Date of Patent: Apr. 10, 2018

(54) DUAL-PROCESSOR ELECTRONIC DEVICE AND METHOD FOR QUICK BOOT UP

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Irawan Kuncoro, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/926,004

(22) Filed: Oct. 29, 2015

(65) Prior Publication Data
US 2016/0132340 A1 May 12, 2016

(30) Foreign Application Priority Data
Nov. 12, 2014 (TW) .............................. 103139175 A

(51) Int. Cl.
G06F 9/44 (2006.01)
G06F 9/54 (2006.01)

(52) U.S. Cl.
CPC .............. *G06F 9/54* (2013.01); *G06F 9/4401* (2013.01); *G06F 9/4405* (2013.01)

(58) Field of Classification Search
CPC ......... G06F 9/4401; G06F 9/4405; G06F 9/54
See application file for complete search history.

(56) References Cited

U.S. PATENT DOCUMENTS

| 2003/0016624 A1* | 1/2003 | Bare | ................. H04L 29/12009 370/217 |
| 2008/0040599 A1 | 2/2008 | Yoshida et al. | |
| 2008/0126842 A1* | 5/2008 | Jacobson | ............ G06F 11/1662 714/6.12 |
| 2011/0246759 A1* | 10/2011 | Lai | ........................ G06F 9/4401 713/2 |

(Continued)

FOREIGN PATENT DOCUMENTS

| CN | 1963759 A | 5/2007 |
| TW | 200606713 A | 2/2006 |

(Continued)

*Primary Examiner* — Thomas Lee
*Assistant Examiner* — Chad Erdman
(74) *Attorney, Agent, or Firm* — ScienBiziP, P.C.

(57) ABSTRACT

A dual-processor electronic device is provided. The dual-processor electronic device includes a first processor, a second processor and a dynamic random access memory. The first processor sends a wake-up command to the second processor to wake up the second processor after performing local initialization. The second processor wakes up, then performs local initialization, copies and decompresses the image file to the dynamic random access memory and sends a ready message to the first processor after the image file is decompressed. The first processor delays startup, and starts the startup process according to the decompressed image file when the ready message is received and the delay-start time is expired. The present disclosure also provides a method for booting up dual-processor electronic device quickly.

8 Claims, 4 Drawing Sheets

(56) References Cited

U.S. PATENT DOCUMENTS

| | | | | |
|---|---|---|---|---|
| 2012/0089814 A1* | 4/2012 | Gupta | .................. | G06F 9/445 |
| | | | | 712/30 |
| 2013/0091346 A1* | 4/2013 | Condorelli | ............. | G06F 8/665 |
| | | | | 713/2 |
| 2014/0149732 A1* | 5/2014 | Sanner, III | ............ | G06F 9/4405 |
| | | | | 713/2 |
| 2014/0351617 A1* | 11/2014 | Connell | ................ | G06F 1/3265 |
| | | | | 713/323 |
| 2015/0106609 A1* | 4/2015 | Koszek | ................ | G06F 9/4405 |
| | | | | 713/2 |
| 2015/0106822 A1* | 4/2015 | Lei | ........................ | G06F 9/5005 |
| | | | | 718/104 |

FOREIGN PATENT DOCUMENTS

| | | | |
|---|---|---|---|
| TW | 201133343 A | 10/2011 | |
| TW | 201416979 A | 5/2014 | |

\* cited by examiner

DUAL-PROCESSOR ELECTRONIC DEVICE AND METHOD FOR QUICK BOOT UP

FIELD

The subject matter herein generally relates to a processor technology, in particular to a dual-processor electronic device and a method for quick boot up.

BACKGROUND

The dual-processor system is widely used in communication electronic devices. With requirements for quick response speed of the electronic devices, the operating speed of dual processor is increasing. Thus, it is necessary for the startup process of the dual processor to be as quick as possible.

BRIEF DESCRIPTION OF THE DRAWINGS

Implementations of the present technology will now be described, by way of example only, with reference to the accompanying figures, wherein.

DETAILED DESCRIPTION

Figure 1:
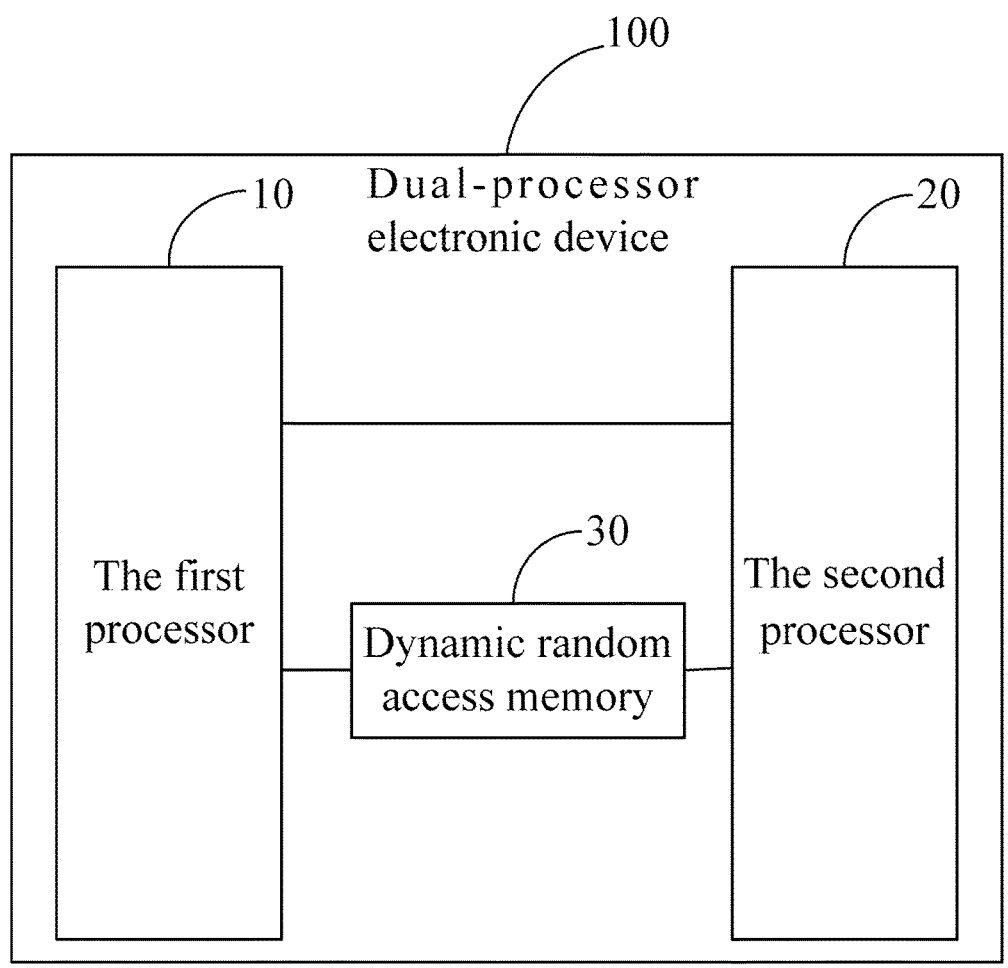
FIG. 1 is a block diagram of a dual-processor electronic device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of a dual-processor electronic device 100 according to an embodiment of the disclosure. In the embodiment, the dual-processor electronic device 100 includes a first processor 10, a second processor 20 and a dynamic random access memory 30. The first processor 10 is electrically connected to the second processor 20 and the dynamic random access memory 30 for easy communication. Each of the first processor 10 and the second processor 20 comprises the image file and other equipment, and is electrically connected with the peripheral equipment. The dynamic random access memory 30 is a synchronous double rate dynamic random access memory.

Figure 2:
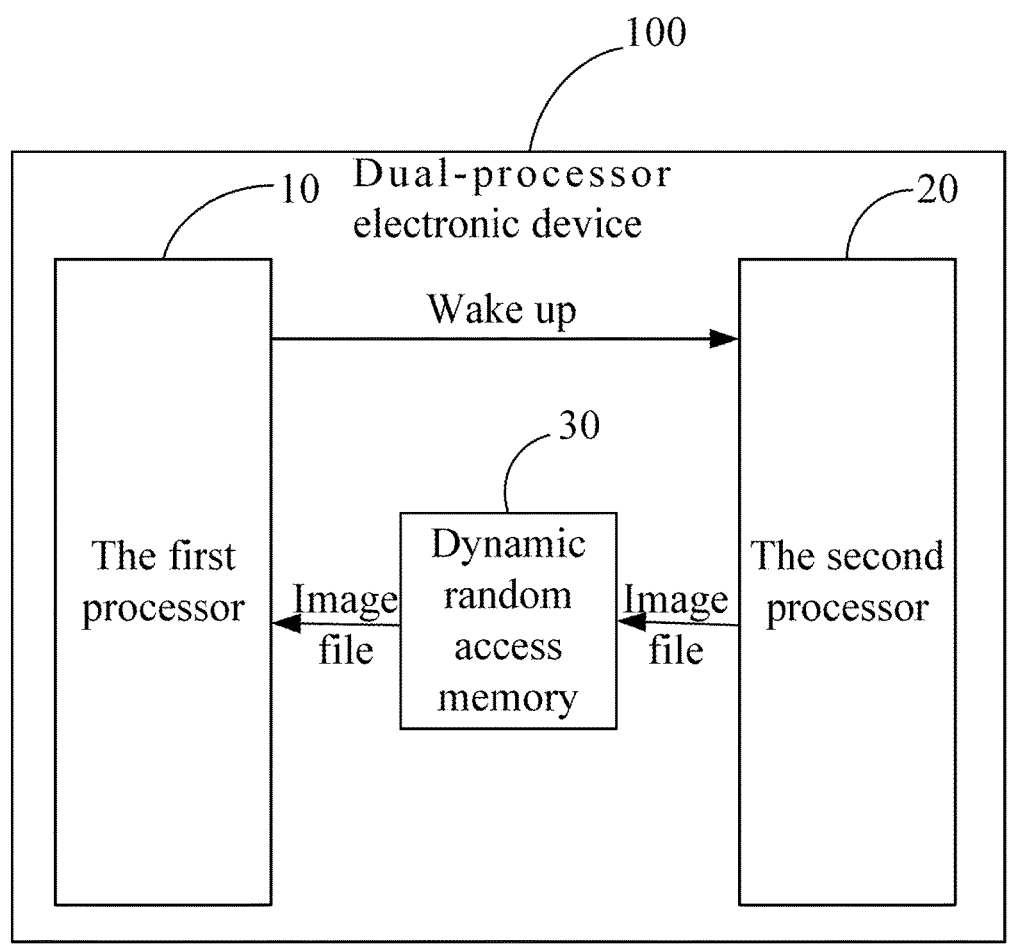
FIG. 2 is a functional block diagram of a method for the second processor assisting the first processor to start up in the dual-processor electronic device according to an embodiment of the disclosure.

FIG. 2 illustrates a functional block diagram of an embodiment of a method in which the second processor 20 assists the first processor 10 to start up in the dual-processor electronic device 100. In the illustrated embodiment, the second processor 20 assists the first processor 10 to start up. In the other embodiments, the first processor 10 can also assist the second processor 20 to start up.

In the illustrated embodiment, the first processor 10 performs the first processor central processing unit (CPU) initialization and calibrates the double rate dynamic random access memory (DDR) before starting up. Then, the first processor 10 sends a wake-up command to the second processor 20 to wake up the second processor before initializing the peripheral equipment when the DDR is calibrated. The second processor 20 wakes up, then performs the second processor CPU initialization and copies the image file to the DDR and decompresses them. Then, the second processor 20 sends the image file and a ready message to the first processor 10 after the image file is decompressed.

The first processor 10 initializes the peripheral equipment when the second processor 20 performs the processes of copying and decompressing the image file, and sets the delay-start time such as 5 seconds to start up automatically when the decompressed image file from the second processor 20 is received. Then the first processor 10 starts the startup process according to the decompressed image file when the ready message from the second processor 20 is received and the delay-start time is expired. If the ready message is not received and the delayed-start time is expired, the first processor 10 sets the delay-start time again and continues to wait for the ready message from the second processor 20.

The replication and the decompression process of the image file originally performed in the first processor 10 is transferred to the second processor 20, so the second processor 20 assists the first processor 10 to complete these processes to save the startup time of the first processor 10.

Figure 3:
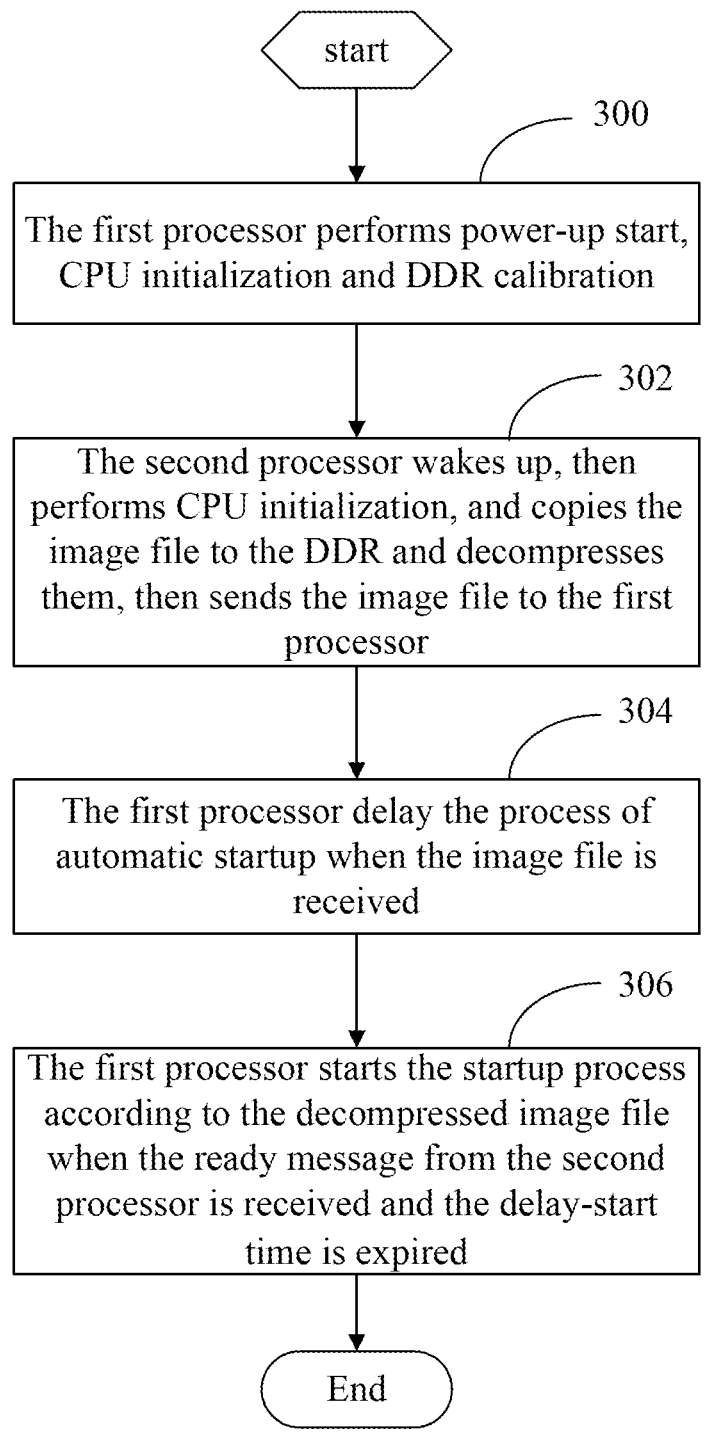
FIG. 3 is a flowchart of a method for the second processor assisting the first processor to start up in the dual-processor electronic device according to an embodiment of the disclosure.

FIG. 3 illustrates a flowchart of an embodiment of a method that the second processor 20 assists the first processor 10 to start up in the dual-processor electronic device 100. In the illustrated embodiment, the second processor 20 assists the first processor 10 to start up, and in the other embodiments the first processor 10 can also assist the second processor 20 to start up.

At block 300, the first processor performs the first processor initialization and calibrates the double rate DDR before performing startup. Next, the first processor performs block 302 before initializing the peripheral equipment when the DDR is calibrated.

At block 302, the first processor sends the wake-up command to the second processor. The second processor wakes up, then performs the second processor initialization and copies the image file to the DDR and decompresses the image files, and sends the image file and the ready message to the first processor when the image file is decompressed. The first processor performs the process of the block 304 after the peripheral equipment is initialized while the second processor is performing the copying and decompressing process of the image file.

At block 304, the first processor sets the delay-start time such as 5 seconds to start up automatically when the decompressed image file is received from the second processor 20. In the embodiment, the second processor sends the decompressed image file to the first processor and puts them into the first processor DDR, thus the first processor "receives" the decompressed image file from the second processor.

At block 306, the first processor starts the startup process according to the decompressed image file when the delay-start time is expired and the ready message from the second processor is received.

The replication and the decompression process of the image file originally performed in the first processor is transferred to the second processor, so the second processor assists the first processor to complete the processes of saving the startup time of the first processor.

Figure 4:
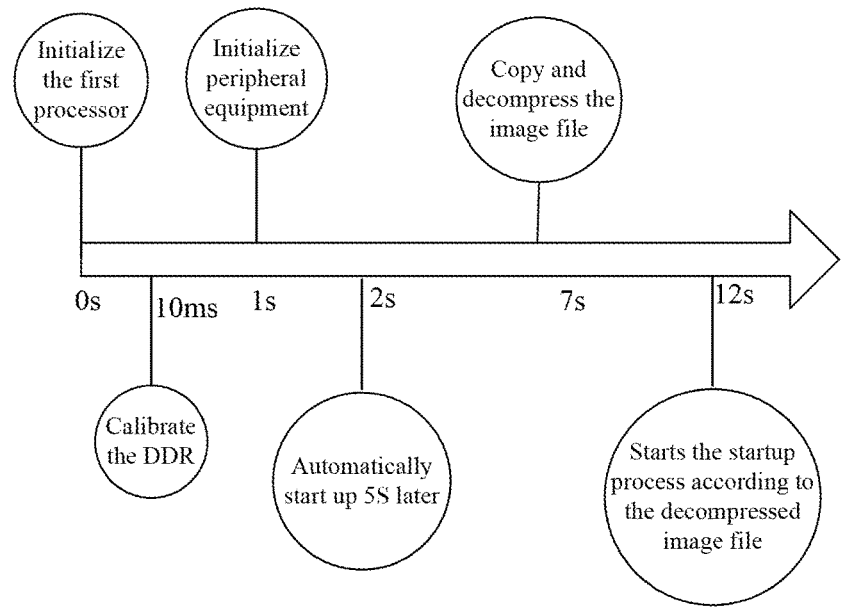
FIG. 4 is a comparison chart of the first processor automatically starting up and the second processor assisting the first processor to start up in the dual-processor electronic device according to an embodiment of the disclosure.
Figure 4:
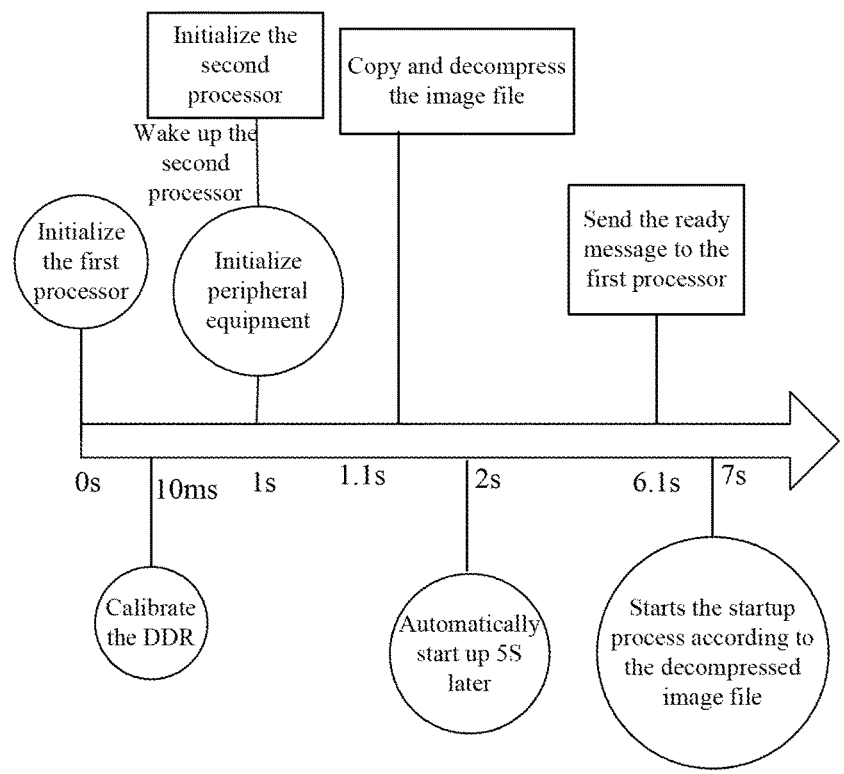

FIG. 4 is a comparison chart for an embodiment of the first processor 10 automatically starting up and the second processor 20 assisting the first processor 10 to start up in the dual-processor electronic device. In the illustrated embodiment, the second processor 20 assists the first processor 10 to start up, and in the other embodiments the first processor 10 can also assist the second processor 20 to start up.

In the illustrated embodiment, the upper chart in the FIG. 4 illustrates an embodiment of a method for the automatic startup of the first processor in the dual-processor electronic device, and the lower chart in the FIG. 4 illustrates an embodiment of a method where the second processor assists the first processor to start up.

The round frames of the upper chart and the lower chart show the processes performed by the first processor, and the square frames of the lower chart show the processes performed by the second processor. The arrowheads of the upper chart and the lower chart extend from the left side to the right side showing the evolution of the startup process, and "S" represents measurement time in seconds.

A contrast can be seen from the two charts in FIG. 4, the startup time of the first processor in the upper chart is 12 seconds and the startup time of the first processor in the lower chart is 7 seconds. Obviously, the startup time of the first processor is shortened by the assistance of the second processor. The second processor assists the first processor to copy and decompress the image file to the DDR before the first processor performs the peripheral equipment initialization. So the startup time of the first processor is shortened because the second processor assists the first processor to perform the later process when the first processor is waiting in a delay-start time.

As can be seen from the above-described embodiments, in the dual-processor electronic device, when one processor is starting up, another processor can assist the performance of the process of copying and decompressing the image to the DDR. Thus a waiting time for the operation with a single processor is reduced and the efficiency of the startup process is improved and the startup time is shortened.

The detailed description above is the introduction of the present disclosure of the dual-processor electronic device and the method for quick boot up. Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A dual-processor electronic device, comprising:
a dynamic random access memory;
a first processor; and
a second processor,
wherein the first processor sends a wake-up command to the second processor to wake up the second processor after performing a local initialization of the first processor,
the second processor wakes up, then performs a local initialization of the second processor, copies an image file to the dynamic random access memory and decompresses the image file, and sends a ready message to the first processor when the image file is decompressed, and
the first processor delays a startup process for a predetermined time, and starts the startup process according to the decompressed image file when the ready message is received and the predetermined time is expired.

2. The device as claimed in claim 1, wherein the first processor performs the peripheral initialization before delaying the startup process.

3. The device as claimed in claim 1, wherein the predetermined time is 5 seconds.

4. The device as claimed in claim 1, wherein the dynamic random access memory is a synchronous double rate dynamic random access memory.

5. A method for booting up the dual-processor electronic device, the dual-processor electronic device including a first processor, a second processor and a dynamic random access memory, comprising:
sending, by the first processor, a wake-up command to the second processor to wake up the second processor after performing local initialization of the first processor; and
waking up the second processor, then performing a local initialization of the second processor;
copying, by the second processor, an image file to the dynamic random access memory and decompressing the image file, and sending a ready message to the first processor when the image file is decompressed;
delaying a startup process of the first processor for a predetermined time, and starting the startup process according to the decompressed image file when the ready message is received by the first processor and the predetermined time is expired.

6. The method as claimed in claim 5, wherein the first processor performs the peripheral initialization before delaying the startup process.

7. The method as claimed in claim 5, wherein the predetermined time is 5 seconds.

8. The method as claimed in claim 5, wherein the dynamic random access memory is a synchronous double rate dynamic random access memory.

* * * * *